United States Patent [19]

Julien et al.

[11] Patent Number: 5,095,466
[45] Date of Patent: Mar. 10, 1992

[54] MARINE SEISMIC PROSPECTING

[75] Inventors: Philippe Julien, Houilles; Jean-Jacques Raoult, Nanterre, both of France

[73] Assignee: Total Compagnie Francaise des Petroles, Paris, France

[21] Appl. No.: 605,332

[22] Filed: Oct. 30, 1990

[30] Foreign Application Priority Data

Oct. 30, 1989 [FR] France ................ 89 14207

[51] Int. Cl.$^5$ .......................................... G01V 1/38
[52] U.S. Cl. ................................................. 367/24
[58] Field of Search ...................... 367/21, 24, 73; 364/421

[56] References Cited

U.S. PATENT DOCUMENTS 3,159,231 3/1964 Silverman et al. ................. 367/73
3,629,800 12/1971 Schneider ........................... 367/24

FOREIGN PATENT DOCUMENTS 2245961 6/1975 France .

OTHER PUBLICATIONS

Geophysics, Deep-Water Peg Legs and Multiples: Emulation and Suppression, Dec. 1986.

*Primary Examiner*—Ian J. Lobo
*Attorney, Agent, or Firm*—Sughrue, Mion, Zinn, Macpeak & Seas

[57] ABSTRACT

The invention relates to a method for marine seismic prospecting, of the type in which a seismic wave is emitted at a determined point close to the surface of the water and the waves reflected by the interfaces between geological formations of the subsoil are recorded as a function of time using receivers arranged at a plurality of locations close to the surface of the water. A mathematical model of multiple signals and peg legs is produced from known wave equations. Data calculated using the mathematical model M(t,x) are adapted with polynomial transfer functions and are subtracted from the data recorded by each of the sensors in order to obtain final data. Using the final data, a graphic representation is prepared of the geological formations of the subsoil in which the seismic wave is propagated.

The invention proposes mathematical processing of the data enabling the elimination of multiple signals and peg legs.

3 Claims, 2 Drawing Sheets

MARINE SEISMIC PROSPECTING

BACKGROUND OF THE INVENTION

The present invention relates to marine seismic prospecting. More particularly, it has as its object an improved method for marine seismic prospecting, in which the interpretation of data, that is the results recorded after the shots, is improved through the elimination of parasite data of the "water bottom multiple" type or the elimination of "peg legs", as referred to in the art. These terms will be defined later in the present specification.

A widely used known research technique for oil or gas consists of carrying out seismic prospecting of the subsoil. In land seismic measurements, from a point on the surface of the ground, seismic waves are emitted, by creating for example the explosion of a powerful charge. Detectors which are called geophones, placed at various points of the surface, collect the acoustic waves which are reflected by the interfaces or "horizons" between geological layers. These detectors convert the reflected waves into electrical signals, and are provided in sufficient number and arranged such that the recorded signals enable the configuration of the geological layers to be reconstituted. In practice, the signal recorded by a geophone has an amplitude which varies constantly as a function of time. The peaks recorded generally correspond to horizons between layers.

In reality, the interpretation of data from a shot is much more complex, because, on the one hand, the waves can traverse a first interface between layers and be reflected on the next interface, then on the first interface and so on before reaching the geophone; on the other hand, the amplitude of the recordings decreases very rapidly depending on the time. The recordings therefore contain peaks corresponding to multiple reflections which it is appropriate to eliminate in order to correctly reconstitute the configuration of the subsoil.

A similar technique is used for marine seismic prospecting, with the shot of an explosive charge being carried out in this case at a few meters below the surface of the water and the receivers or "hydrophones" themselves being arranged at the same depth. In this method of prospecting, the disadvantages indicated above are moreover amplified by the fact that the sea bed is highly reflective, as is the water-air interface. A seismic wave will therefore be reflected successively on these two interfaces, giving rise, on the hydrophones, to parasite signals corresponding to the multiple reflections of the water layer.

The multiple reflections can be of different types and the present invention relates more particularly to the multiple reflections of the sea bed, for which the seismic wave does not penetrate into the geological formations but is reflected on the sea bed, and to the "peg legs" for which the wave penetrates into the underground formations and then is reflected on an interface before again traversing the water and rebounding into this layer of water.

As can be seen in FIG. 1, an explosion of a charge at a point A situated close to the surface S of the water can give rise to a wave 0 which is reflected against the sea bed F, then against the air-water interface at the surface S and again against the sea bed F, before reaching the hydrophone arranged at the point H situated close to the surface of the water. The signal which the receiver will record will therefore be representative of neither the sea bed nor the interface of the two geological layers, but of a multiple reflection of the sea bed.

In FIG. 2, the wave 0 traverses the bed F to penetrate into a subjacent geological formation, then is reflected on the interface I separating that formation from the next layer. The reflected wave traverses the bed F to return into the layer of water. It is again reflected against the surface S, then against the bed F, before reaching the hydrophone H, which records a signal corresponding to the path followed by the wave 0. This path has the profile represented in FIG. 2 and, because of its asymmetrical form, it is familiarly known in the art by the expression "peg leg", or "wooden leg".

Coherent signals, representative of sea bed multiples and peg legs are consequently found on the recordings made by the geophones, but they are completely devoid of interest for knowledge of the subsoil. Moreover, they can be superposed on primary reflections and, therefore, conceal useful information. It is therefore appropriate to eliminate them from the data obtained following shots, in order to obtain a representative recording of the geological formations alone.

SUMMARY OF THE INVENTION

One object of the present invention, therefore, in marine seismic prospecting of the type indicated above, is to eliminate at least partially the parasite signals corresponding to the sea bed multiples and the "peg legs" from the recordings made by the sensors during a prospecting shot.

Another object of the invention is to propose a method of this type in which the elimination from the recordings made by the sensors of signals corresponding to sea bed multiples and to "peg legs" does not cause an increase in the base noise of the recordings or an attenuation of the primary signals which it is, on the contrary, sought to isolate from the parasite signals.

Methods of this type have already been proposed in which the elimination of multiple signals is carried out either by filtering in a certain field, or by filtering using predictive deconvolution.

The first method is based on the difference in velocity between the multiple signals and the primary events. If a multiple and a primary with a given time t are considered, since the velocity of the multiple is lower, the signals of the multiple recorded by sensors which are more and more distant from the shot point will be distributed along a hyperbola with a more pronounced curve than that of the primary signals and it will thus be possible to carry out the segregation of the multiples.

The principal problem with this method resides in the difference in speed between multiples and primaries. In effect, if the velocity law of the multiples is close to that of the primaries, the curves of the hyperbolas will be similar, even identical for the sensors close to the source. Data on the primaries could be erased, or the multiples will not even be correctly deleted.

Filtering using predictive deconvolution uses the repetitive nature of multiple reflections. The filter generally used is the Wienner-Levinson predictive filter. In effect, the arrival of a multiple reflection can be foreseen and eliminated.

The problems connected with these methods are all the more difficult to resolve when the working zone is complex, for example close to a salt dome.

The present invention seeks to overcome these disadvantages. The method proposed is applied directly on the shot points. It works even if the apparent velocities of the multiples and primaries are identical.

BRIEF DESCRIPTION OF THE DRAWINGS

These two types of reflection are schematically illustrated in the accompanying drawings, in which.

DETAILED DESCRIPTION OF THE PREFERRED EMBODIMENT

Figure 1:
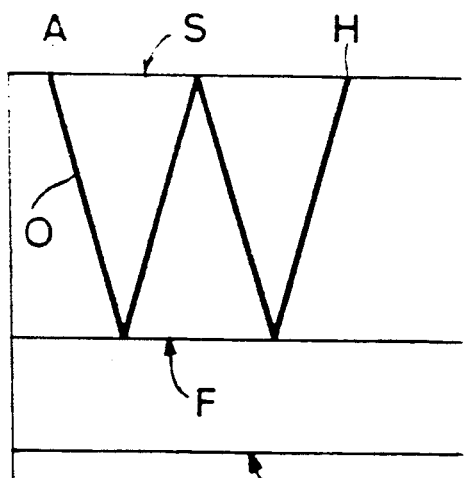
FIG. 1 illustrates the formation of a water bottom multiple.
Figure 2:
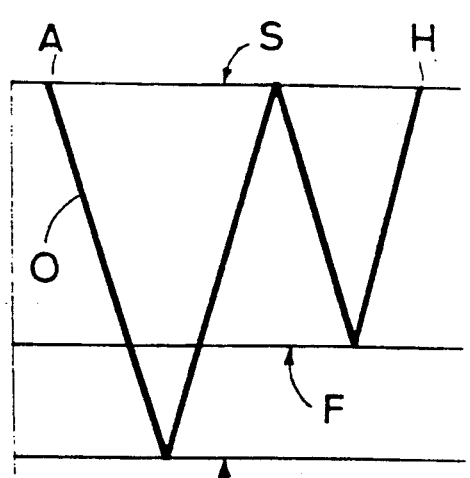
FIG. 2 illustrates the formation of a peg leg.

The inventive method is based on the so-called modelization and subtraction principle, in accordance with which, from raw data obtained at the shot points, a mathematical model of the multiples is prepared through the equation of the waves, which is then subtracted from these raw data.

The subtraction of the modelized multiples from the raw data cannot be carried out directly. In effect, since the modelization is not perfect, the modelized multiples have differences of amplitudes and dephasings with the real data. These imperfections are connected to the fact that the topography of the sea bed is poorly known, that the wave equation used gives an imperfect description of the reality and that the reflection coefficients are unknown.

The basic method described by Berryhill and Kim for adapting the modelized multiples ("Deep-water peg legs and multiples: emulation and suppression", Geophysics, Vol. 51, No. 12, p. 277, 1986) consists of dividing the seismic traces into segments. These segments are first correlated with the equivalent segments of the modelized data, in order to define a correction in time, then a transfer function is determined in the frequency domain between the modelized data and the real data, in order to equalize the amplitudes.

This method has a major disadvantage when the data are sounded. In effect, in this case, the noise present on the modelized traces and situated opposite the primaries is increased by the transfer function. This means that not only are the multiples attenuated, so are the primaries.

The present invention seeks to eliminate the multiples without altering the signals corresponding to the primaries and, for this purpose, it proposes, using transfer functions depending on the time and the distance from the shot point, correcting the mathematical model of the multiples prepared by conventional techniques.

Consequently, an object of the invention is a method of marine seismic prospecting, of the type in which a seismic wave is emitted at a determined point close to the surface of the water and the waves reflected by the interfaces between geological formations of the subsoil are recorded as a function of time using receivers arranged at a plurality of locations close to the surface of the water, a mathematical model of the multiple signals and "peg legs" is produced using known wave equations, data calculated using said mathematical model are subtracted from the data recorded by each of said sensors in order to obtain corrected data. Using the corrected data, a graphic representation is prepared of the geological formations of the subsoil in which the seismic wave is propagated, the method being characterized in that, prior to the operation of subtracting the calculated data, polynomial transfer functions are applied thereto taking into account the time t passed since the emission of the seismic wave and the distance x of the sensor from the seismic source, with a view to adapting, in phase and in amplitude, the calculated data to the recorded data, in order to obtain adapted modelized data $M_{adap}(t,x)$, which are subtracted from the recorded data $P(t,x)$ in place of the calculated data, which leads to a misfit $$R(t,x) = P(t,x) - M_{adap}(t,x)$$

with the coefficients of the transfer functions being calculated so as to minimize, in the sense of the least squares or lowest absolute values, the sum on the times t and on the distances x of the square or of the absolute value of $R(t,x)$.

More particularly, the transfer functions will be functions of the time (t) and of the distance (x) to the shot point of the type:

$$C(t,x) = (1, t, t^2, \ldots, t^N) \begin{pmatrix} C_{1,1} & C_{1,2} & C_{1,3} & \cdots & C_{1,m+1} \\ C_{2,1} & C_{2,2} & \cdot & \cdots & \cdot \\ C_{3,1} & \cdot & \cdot & \cdots & \cdot \\ \cdot & \cdot & \cdot & \cdots & \cdot \\ \cdot & \cdot & \cdot & \cdots & \cdot \\ \cdot & \cdot & \cdot & \cdots & \cdot \\ C_{n+1,1} & \cdot & \cdot & \cdots & C_{n+1,m+1} \end{pmatrix} \begin{pmatrix} 1 \\ x \\ x^2 \\ \cdot \\ \cdot \\ \cdot \\ x^m \end{pmatrix}$$

or:

$$C(t,x) = \sum_{i=1}^{n+1} \sum_{j=1}^{m+1} C_{i,j} t^{i-1} x^{j-1}.$$

If we call $P(t,x)$ the data observed on a shot point, $M(t,x)$ the corresponding modelized multiple reflections, $A(t,x)$ the transfer function relative to the amplitude of the signal and $B(t,x)$ the transfer function relative to the signal phase, the adaptation of the modelized data $M(t,x)$ at a point $(t,x)$ will be written:

$$M_{adap}(t,x) = I[(M(B(t,x),x))] \cdot A(t,x).$$

In fact, the phase adaptation necessitates a reinterpolation of the traces being considered. The function $B(t,x)$ gives new absolute positions of each of the values (amplitudes) for each trace. The traces must therefore be resampled with a constant step, that is make an interpolation, represented here by the operator I.

At the point $(t,x)$, a misfit corresponding to the difference between the observed data $P(t,x)$ and the adapted modelized data can be calculated:

$$R(t,x) = P(t,x) - [I(M(B(t,x),x)) \cdot A(t,x)]$$

or $$R(t,x) = P(t,x) - M_{adap}(t,x).$$

The coefficients aij and bij of the transfer functions $A(t,x)$ and $B(t,x)$ are determined at best, so as to minimize, in the sense of the least squares or lowest absolute values, the sum Res on the times t and on the distances x of the square or the absolute value of R(t,x):

either:

$$Res = \sum_{t=1}^{T} \sum_{x=1}^{X} [R(t,x)]^2$$

or $$Res = \sum_{t=1}^{T} \sum_{x=1}^{X} [R(t,x)].$$

In a preferred embodiment of the invention, the polynomials $C'(t,x)$ defined using the Tchebycheff polynomials $T_i(t)$ and $T_j(x)$ will be substituted for the polynomials $C(t,x)$ defined above:

$$C'(t,x) = (T_o(t), T_1(t), \ldots,$$

$$T_n(t)) \begin{pmatrix} c_{1,1} & c_{1,2} & \ldots & c_{1,m+1} \\ c_{2,1} & c_{2,2} & \ldots & . \\ . & . & \ldots & . \\ . & . & \ldots & . \\ c_{n+1,1} & . & \ldots & c_{n+1,m+1} \end{pmatrix} \begin{pmatrix} T_o(x) \\ T_1(x) \\ . \\ . \\ T_m(x) \end{pmatrix}$$

In effect, with C(t,x), all the zeros of this polynomial are not contained in the study range in t and in x, and, for the high degree polynomials, problems of numerical size can occur when the values of t are high.

The problem is eliminated with the $T_i(t)$ and $T_j(x)$ polynomials of Tchebycheff, and it can be proved that they can be calculated by the recursion relation:

$$T_{n+1}(x) - 2 \times T_n(x) + T_{n-1}(x) = 0,$$

or, with, in order to initialize it:

$$T_0(x) = 1, T_1(x) = x, t_2(x) = 2x^2 - 1, T_3(x) = 4x^3 - 3x \ldots$$

All the zeros of the Tchebycheff polynomials are between the range $[-1, +1]$, which is very important, because, by bringing back the variables t and x into the range $[-1, +1]$, transfer functions can be calculated in which all the variations will be taken into account.

Preferably, more weight can be given to the multiples in the function R(t,x) to be minimized. For this purpose, at one point (t,x), the misfit to be taken into consideration will be:

$$R_p(t,x) = R(t,x) \times [env(M(t,x))]^2$$

where the operator env ( ) is the envelope of the traces in time M(t,x) for each value of x.

The function to be minimized will then be:

$$Res_p = \sum_t \sum_x [R_p(t,x)] \quad (L^1 \text{ norm})$$

or:

$$Res_p = \sum_t \sum_x [R_p(t,x)]^2 \quad (L^2 \text{ norm}).$$

The function to be minimized is not linear and, consequently, an optimization procedure may or may not converge towards an absolute minimum of the misfit. In order to ensure a correct convergence of the process towards the absolute minimum of the residue, it is preferable to initialize the optimization method with a solution which is as close as possible to the final solution.

The results which are obtained by applying the program as described on a shot point in its entirety are good but are not entirely satisfactory, because the calculation time is high and there remain small residues of multiples.

This problem can be resolved by cutting the shot gather into windows in time and in distance and by applying the preceding method to each of the windows. This reduces the calculation time decreasing the degree of the Tchebycheff polynomials and considerably improves the quality of the result.

The following examples illustrate embodiments of the invention.

EXAMPLE 1

In this example, synthetic data were used which were obtained by using a horizontal reflector, with a reflection coefficient of 0.5, and a wave speed of 1500 m/s. Two multiple reflections were created.

For the elimination of these multiples, after modelization thereof, Tchebycheff polynomials were used with a degree of 5 in t and 5 in x for the amplitude, and with a degree of 3 in t and 3 in x for the phase. After systematic research, the initial value of the residue was 1.63e−4, with $a_{11} = 0.49$, $b_{11} = 65.0$, $b_{21} = 64.0$ for the principal coefficients. Optimization using the so-called Quasi-Newton method enabled the residue to be minimized to a value of 1.44e−4.

The norm used here was norm L2.

Figure 3A:
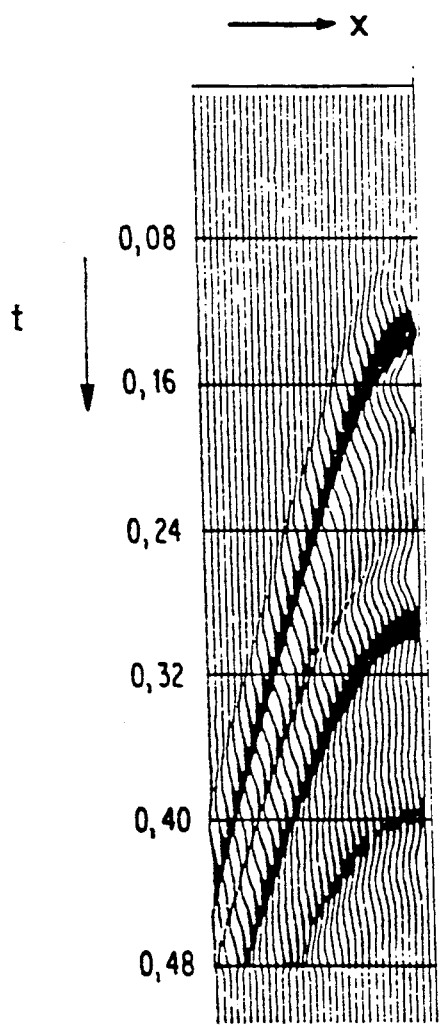
FIGS. 3a, 3b and 3c illustrate the use of the invention in a practical case (Example 1)

FIG. 3a represents the synthetic data recorded with 32 receivers, as a function of the time expressed in seconds (ordinals) and of the distance (abscissa).

Figure 3B:
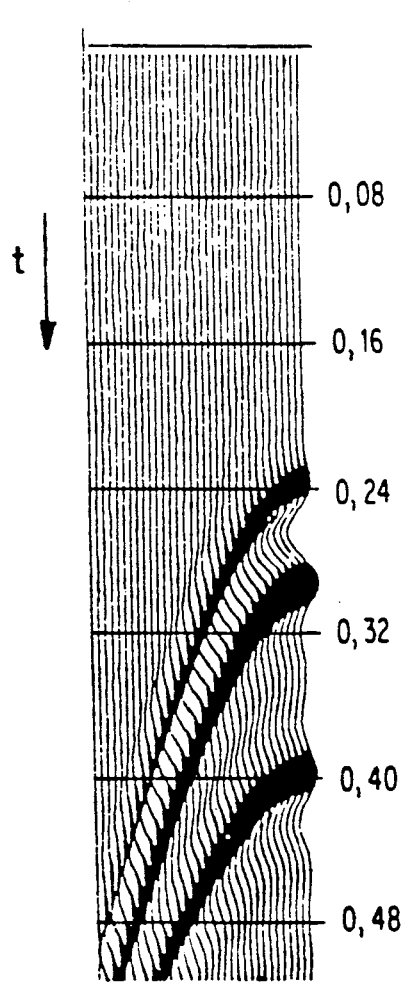

FIG. 3b similarly represents the modelized multiple reflections.

Figures 3C, 4A, 4B:
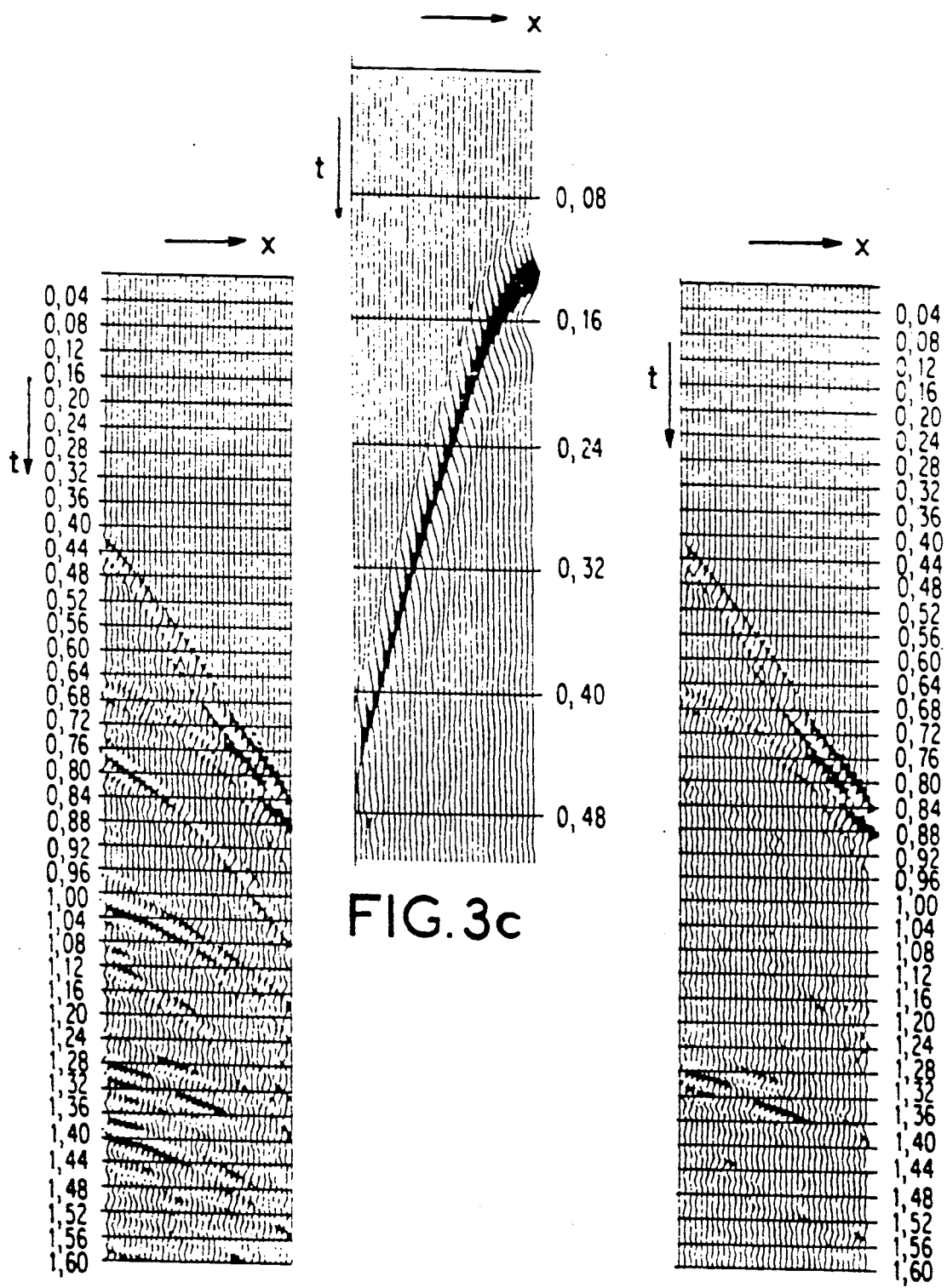
FIGS. 4a and 4b illustrate another embodiment of use of the invention (Example 2).

FIG. 3c shows the residual data obtained by subtracting the modelized multiples corrected in accordance with the invention by using transfer functions calculated using Tchebycheff polynomials from the synthetic data.

Good suppression of the multiple reflections was noted without alteration of the primary signal.

EXAMPLE 2

In this example, real data from a shot were used, which are represented on FIG. 4a (distance x in abscissa, time t expressed in seconds in ordinals).

After modelization of the multiple reflections, the shot gather was cut four times in time and three times in distance, but the cutting in distance was done only on the last three windows in time.

The transfer functions used Tchebycheff polynomials. They were of degree 4 in t and 4 in x for the amplitude, and of degree 3 in t and 3 in x for the phase.

FIG. 4b represents the residual data, after subtraction of the modelized multiples adapted from the initial data.

Very good elimination of the multiple reflections was noted.

The invention therefore provides an effective method for the suppression of water bottom multiples and "peg legs" in a method of marine seismic prospecting.

We claim:

1. A method for maine seismic prospecting, of the type in which a seismic wave is emitted at a determined point close to the surface of the water and the waves reflected by the interfaces between geological formations of the subsoil are recorded as a function of time using receivers arranged at a plurality of locations close to the surface of the water, a mathematical model M(t,x) of the multiple signals and peg legs is computed from known wave equations, data calculated using said mathematical model M(t,x) are subtracted from the data recorded by each of said receivers in order to obtain corrected data and, using said corrected data, a graphic representation is prepared of the geological formations of the subsoil in which said seismic wave is propagated, said method further comprising the following steps:

prior to the operation of subtracting the calculated data, applying polynomial transfer functions C(t,x) having the form $$C(t,x) = (T_0(t), T_1(t), \ldots, T_n(t)) \begin{pmatrix} c_{1,1} & c_{1,2} & \ldots & c_{1,m+1} \\ c_{2,1} & c_{2,2} & \ldots & \cdot \\ \cdot & \cdot & \ldots & \cdot \\ \cdot & \cdot & \ldots & \cdot \\ \cdot & \cdot & \ldots & \cdot \\ c_{n+1,1} & \cdot & \ldots & c_{n+1,m+1} \end{pmatrix} \begin{pmatrix} T_0(x) \\ T_1(x) \\ \cdot \\ \cdot \\ \cdot \\ T_m(x) \end{pmatrix}$$

wherein $T_{i(t)}$ and $T_{i(x)}$ are Tchebycheff polynomials from which said polynomial transfer functions are derived, as a function of the time t passed since the emission of the seismic wave and the distance x of the receiver from the seismic source;

adapting, in phase and in amplitude, the calculated data to the recorded data in accordance with said applying step, in order to obtain adapted modelized data $M_{adapt}(t,x)$:

subtracting the adapted modelized data $M_{adapt}(t,x)$ from recorded data P(t,x) in place of the calculated data, to provide a misfit $$R(t,x) = P(t,x) - M_{adapt}(t,x)$$

with the coefficients of the transfer functions being calculated so as to minimize, in the sense of the least squares or the lowest absolute values, the sum on the times t and on the distances x of the square or of the absolute value of R(t,x).

2. The method in accordance with claim 1, wherein a misfit $R_p(t,x)$ defined by:

$$R(t,x) = T(t,x) \cdot [env(M(t,x))]$$

is substituted for the residue to be minimized R(t,x), where env (lo) is a mathematical function designating the envelope of traces in time M(t,x) for each value of x.

3. The method in accordance with one of claims 1 or 2, wherein the method is applied to subparts or "windows" of a shot gather rather than on a shot record considered in its entirety.

* * * * *